(12) United States Patent
Mancini et al.

(10) Patent No.: US 9,676,632 B2
(45) Date of Patent: Jun. 13, 2017

(54) METHOD FOR PURIFYING SILICON

(71) Applicant: Silicor Materials Inc., San Jose, CA (US)

(72) Inventors: Paul A. Mancini, Mississauga (CA); Alain Turenne, Kitchener (CA)

(73) Assignee: Silicor Materials Inc., San Jose, CA (US)

(*) Notice: Subject to any disclaimer, the term of this patent is extended or adjusted under 35 U.S.C. 154(b) by 0 days.

(21) Appl. No.: 14/409,536

(22) PCT Filed: Jun. 25, 2013

(86) PCT No.: PCT/US2013/047548
§ 371 (c)(1),
(2) Date: Dec. 19, 2014

(87) PCT Pub. No.: WO2014/004463
PCT Pub. Date: Jan. 3, 2014

(65) Prior Publication Data
US 2015/0376017 A1    Dec. 31, 2015

Related U.S. Application Data

(60) Provisional application No. 61/788,008, filed on Mar. 15, 2013, provisional application No. 61/663,874, filed on Jun. 25, 2012.

(51) Int. Cl.
*C01B 33/037*    (2006.01)
(52) U.S. Cl.
CPC ........ *C01B 33/037* (2013.01); *C01P 2006/80* (2013.01)

(58) Field of Classification Search
CPC ..................... C01B 33/037; C01P 2006/80
See application file for complete search history.

(56) References Cited

U.S. PATENT DOCUMENTS

| 4,312,848 A | 1/1982 | Dawless |
| 4,539,194 A | 9/1985 | Halvorsen |
| 6,861,040 B1 | 3/2005 | Ceccaroli et al. |
| 7,682,585 B2 | 3/2010 | Lynch et al. |
| 7,727,503 B2 | 6/2010 | Nichol |
| 7,883,680 B2 | 2/2011 | Nichol |
| 9,243,311 B2 | 1/2016 | Nichol |

(Continued)

FOREIGN PATENT DOCUMENTS

| CA | 2680515 A | 9/2008 |
| CN | 1659313 A | 8/2005 |

(Continued)

OTHER PUBLICATIONS

"European Application Serial No. 13735143.3, Office Action mailed Feb. 12, 2015", 2 pgs.

(Continued)

*Primary Examiner* — Anthony J Zimmer
(74) *Attorney, Agent, or Firm* — Schwegman Lundberg & Woessner, P.A.

(57) ABSTRACT

A method that includes: (a) forming a molten liquid from a solvent metal, silicon, and an alkali magnesium halide; (b) cooling the molten liquid to provide silicon crystals and a mother liquor; and (c) separating the silicon crystals from the mother liquor.

19 Claims, 3 Drawing Sheets

(56) References Cited

U.S. PATENT DOCUMENTS

| | | | |
|---|---|---|---|
| 2009/0092535 A1* | 4/2009 | Nichol | C01B 33/037 423/350 |
| 2009/0274607 A1* | 11/2009 | Nichol | C01B 33/037 423/349 |
| 2009/0274608 A1 | 11/2009 | Enebakk et al. | |
| 2010/0254879 A1 | 10/2010 | Nichol | |
| 2011/0250118 A1 | 10/2011 | Zeaiter | |
| 2015/0175431 A1 | 6/2015 | Turenne | |

FOREIGN PATENT DOCUMENTS

| | | |
|---|---|---|
| CN | 1994877 A | 7/2007 |
| CN | 101460399 A | 6/2009 |
| CN | 101668701 A | 3/2010 |
| CN | 101855391 A | 10/2010 |
| CN | 102616787 A | 8/2012 |
| DE | 112008000682 | 2/2010 |
| EP | 0099948 A1 | 2/1984 |
| JP | 2002-173718 A | 6/2002 |
| JP | 2002-194453 A | 7/2002 |
| JP | 2015529741 A | 10/2015 |
| TW | 200711999 A | 4/2007 |
| TW | 200801262 A | 1/2008 |
| TW | 200806577 A | 2/2008 |
| WO | WO-2008/110012 A1 | 9/2008 |
| WO | WO-2009/012583 A1 | 1/2009 |
| WO | WO-2014/004392 A1 | 1/2014 |
| WO | WO-2014/004463 A1 | 1/2014 |

OTHER PUBLICATIONS

"European Application Serial No. 13739310.4, Office Action mailed Feb. 13, 2015", 2 pgs.
"International Application Serial No. PCT/US2013/047369, International Preliminary Report on Patentability mailed Jan. 8, 2015", 6 pgs.
"International ApplicationSerial No. PCT/U52013/047369, International Search Report mailed Sep. 5, 2013", 4 pgs.
"International Application Serial No. PCT/U52013/047369, Written Opinion mailed Sep. 5, 2013", 4 pgs.
"International Application Serial No. PCT/US2013/047548, International Preliminary Report on Patentability mailed Jan. 8, 2015", 7 pgs.
"International Application Serial No. PCTU52013047548, International Search Report mailed Oct. 14, 2013", 3 pgs.
"International Application Serial No. PCTU52013047548, Written Opinion mailed Oct. 14, 2013", 5 pgs.
"Japanese Application Serial No. 2015-520369, Written Amendment filed Mar. 24, 2015", (w/ English Translation of Amended Claims), 8 pgs.
"Taiwanese Application Serial No. 102122410, Office Action mailed Jul. 24, 2014", (w/ English Translation), 7 pgs.
"Taiwanese Application Serial No. 102122410, Response filed Oct. 24, 2014 to Office Action mailed Jul. 24, 2014", (w/ English Summary and Translation of Pending Claims), 98 pgs.
"Taiwanese Application Serial No. 102122459, Office Action mailed May 22, 2014", (w/ English Translation), 13 pgs.
"Taiwanese Application Serial No. 102122459, Response filed Sep. 4, 2014 to Office Action mailed May 22, 2014", (w/ English Summary and Translation of Pending Claims), 91 pgs.
Yoshikawa, Takeshi, et al., "Boron Removal by Titanium Addition in Solidification Refining of Silicon with Si-Al Melt", *Metallurgical and Materials Transactions B, vol. 36B*, (2005), 837-842.
Chinese Application Serial No. 201380043296.9, Office Action mailed Mar. 16, 2016, 10 pgs.
Chinese Application Serial No. 201380043865.X, Office Action mailed Nov. 13, 2015, W/ English Translation, 15 pgs.
Japanese Application Serial No. 2015-520369, Examiners Decision of Final Refusal mailed Jan. 25, 2016, (w/ English Translation), 5 pgs.
Japanese Application Serial No. 2015-520369, Office Action mailed Jul. 23, 2015, (w/ English Translation), 6 pgs.
Japanese Application Serial No. 2015-520369, Written Amendment and Argument filed Nov. 2, 2015 in response to Office Action mailed Jul. 23, 2015, (w/ English Translation), 14 pgs.
Japanese Application Serial No. 2015-520390, Office Action mailed Mar. 9, 2016, (w/ English Translation), 35 pgs.
Korean Application Serial No. 10-2015-7001836, Office Action mailed Apr. 11, 2016, With English Translation, 10 pgs.
Taiwanese Application Serial No. 103143779, Office Action mailed Jun. 17, 2015, (w/ English Translation), 9 pgs.
Taiwanese Application Serial No. 103143779, Response filed Oct. 15, 2015 to Office Action mailed Jun. 17, 2015, (w/ English Translation of Amended Claims), 85 pgs.
U.S. Appl. No. 14/409,435, filed Dec. 18, 214, Method to Purify Aluminum and Use of Purified Aluminum to Purify Silicon.
Chinese Application Serial No. 201380043296.9, Office Action mailed Nov. 1, 2016, (w/ English Translation), 16 pgs.
Chinese Application Serial No. 201380043296.9, Response filed Jul. 29, 2016 to Office Action mailed Mar. 16, 2016, (wi English Translation of Claims), 20 pgs.
Chinese Application Serial No. 201380043865.X, Office Action mailed May 13, 2016, (w/ English Translation), 22 pgs.
Chinese Application Serial No. 201380043865.X, Response filed Mar. 28, 2016 to Office Action mailed Nov. 13, 2015, with English translation of claims, 28 pgs.
Chinese Application Serial No. 201380043865,X, Response filed Sep. 27, 2016 to Office Action mailed May 13, 2016, (w/ English Translation of Claim 1), 15 pgs.
European Application Serial No. 13735143.3, Office Action mailed Oct. 18, 2016, 6 pgs.
European Application Serial No. 13739310.4, Communication Pursuant to Article 94(3) EPC mailed Dec. 6, 2016, 5 pgs.
Japanese Application Serial No. 2015-520369, Notice of Appeal filed May 12, 2016 to Examiners Decision of Final Refusal mailed Jan. 25, 2016, (w. English Translation), 17 pgs.
Japanese Application Serial No. 2015-520390, Amendment and Argument filed May 30, 2016 to Office Action mailed Mar. 9, 2016, (w/ English Translation), 23 pgs.
Japanese Application Serial No. 2015-520390, Office Action mailed Nov. 2, 2016, (w/ English Translation), 6 pgs.
Korean Application Serial No. 10-2015-7001827, Final Office Action mailed Dec. 20, 2016, With English Translation, 6 pgs.
Korean Application Serial No. 10-2015-7001827, Office Action mailed Jun. 14, 2016, (With English Translation), 9 pgs.
Korean Application Serial No. 10-2015-7001827, Response filed Aug. 12, 2016 to Office Action mailed Jun. 14, 2016, (w/ English Translation), 37 pgs.
Korean Application Serial No. 10-2015-7001836, Argument and Amendment filed May 23, 2016 to Office Action mailed Apr. 11, 2016, (w/ English Translation), 29 pgs.
"Chinese Application Serial No. 201380043296.9, Response filed Jan. 16, 2017 to Office Action mailed Nov. 11, 2016", (w/ English Translation), 4 pgs.
"Chinese Application Serial No. 201380043865.X, Office Action mailed Dec. 30, 2016", (w/ English Translation), 15 pgs.
"European Application Serial No. 13735143.3, Response filed Feb. 8, 2017 to Office Action mailed Oct. 18, 2016", 61 pgs.
"Japanese Application Serial No. 2015-520390, Examiners Decision of Final Refusal mailed Feb. 22, 2017", (w// English Translation), 8 pgs.
"Japanese Application Serial No. 2015-520390, Written Argument and Amwendment filed Jan. 12, 2017 to Office Action mailed Nov. 2, 2017", 17 pgs.
"Korean Application Serial No. 10-2015-7001827, Argument and Amendment filed Jan. 20, 2017", (w/ English Translation), 10 pgs.
"Korean Application Serial No. 10-2015-7001827, Notice of Allowance mailed Feb. 8, 2017", (w/ English Translation), 7 pgs.

\* cited by examiner

METHOD FOR PURIFYING SILICON

RELATED APPLICATIONS

This application is a U.S. National Stage Filing under 35 U.S.C. §371 from International Application No. PCT/US2013/047548, entitled "METHOD OF PURIFYING SILICON," filed on Jun. 25, 2013, and published as WO 2014/004463 A1 on Jan. 3, 2014, which claims the benefit of priority to U.S. Provisional Application No. 61/788,008, filed Mar. 15, 2013, and claims the benefit of priority to U.S. Provisional Application No. 61/663,874, filed Jun. 25, 2012, which are hereby incorporated by reference in their entireties.

BACKGROUND

Solar cells are currently utilized as an energy source by using their ability to convert sunlight to electrical energy. Silicon is used almost exclusively as the semiconductor material in such photovoltaic cells. A significant limitation currently on the use of solar cells has to do with the cost of purifying silicon to solar grade (SG) silicon. In view of current energy demands and supply limitations, there is an enormous need for a more cost efficient way of purifying metallurgical grade (MG) silicon (or any other silicon having greater impurities than solar grade) to solar grade silicon.

SUMMARY

Figure 1:
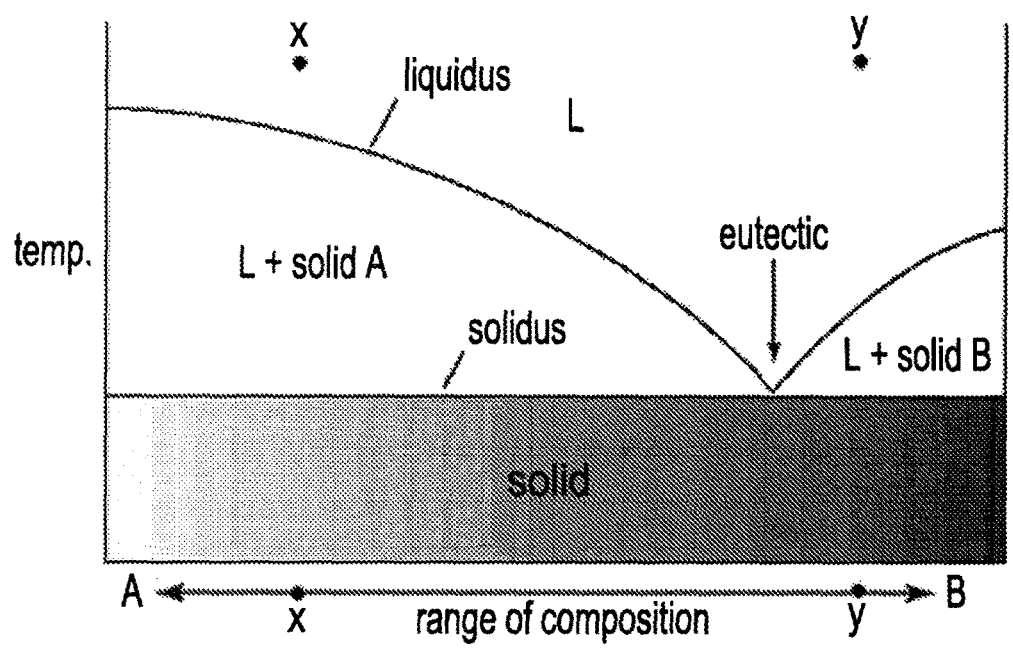
FIG. 1 illustrates a diagram showing the state of a composition as a function of temperature.

The present invention provides a method that includes: (a) forming a molten liquid from a solvent metal, silicon, and an alkali magnesium halide; (b) cooling the molten liquid to provide silicon crystals and a mother liquor; and (c) separating the silicon crystals from the mother liquor.

Methods of specific embodiments of the present invention purify silicon (e.g., the methods provide for purified silicon). Methods of additional specific embodiments of the present invention purify silicon from phosphorous. Methods of additional specific embodiments of the present invention purify silicon from boron. Methods of additional specific embodiments of the present invention provide for purified silicon that includes less than about 4 ppmw phosphorous. Methods of additional specific embodiments of the present invention provide for purified silicon that includes less than about 5 ppmw boron. Methods of additional specific embodiments of the present invention provide for purified silicon in the form of flakes or crystals, having an average mean diameter of at least about 0.5 cm.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Recitation in a claim to the effect that first a step is performed, then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps may also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Definitions

As used herein, an "alkali magnesium halide" refers to a binary salt based on $MgX_2$ and YX, wherein X is a halide (e.g., each X is independently Cl or Br) and Y is an alkali (e.g., K or Na). For example, the alkali magnesium halide can refer to a binary salt based on $MgCl_2$, and KCl or NaCl. The alkali magnesium halide is a chemical composition that includes at least one of $YMgX_3$ (e.g., $KMgCl_3$ or $MgNaCl_3$), $Y_2MgX_4$ (e.g., $K_2MgCl_4$ or $Na_2MgCl_4$), and $Y_3Mg_2X_7$ (e.g., $K_3Mg_2Cl_7$); wherein X is a halide (e.g., each X is independently Cl or Br), and Y is an alkali (e.g., each Y is independently K or Na). Specifically, the alkali magnesium halide can include a potassium magnesium chloride.

As used herein, "potassium magnesium chloride" refers to a binary salt of $MgCl_2$ and KCl. The potassium magnesium chloride is a chemical composition that includes at least one of $KMgCl_3$, $K_2MgCl_4$, and $K_3Mg_2Cl_7$. The potassium magnesium chloride is commercially available, e.g., as PROMAG (synthetic anhydrous carnallite) from Pyrotek® (Spokane, Wash.). The potassium magnesium chloride can be hydrated, or anhydrous. The potassium magnesium chloride can be synthetic or naturally occurring. Additionally, the potassium magnesium chloride can be a fine particle, or in a granular form (0.03-0.12 in, or 0.8-3.15 mm).

As used herein, "carnallite" refers to an evaporite halide mineral, a hydrated alkali magnesium halide with formula: $KMgCl_3 \cdot 6(H_2O)$. Synthetic carnallite crystal specimens can be reproduced by 1.5 mole percentage of KCl and 9.8 moles of $MgCl_2 \cdot 6H_2O$ and by slow crystallization at 25° C.

As used herein, "purifying" refers to the physical separation of a substance of interest from one or more foreign or contaminating substances. In contrast, "impurities" or "impurity" refers to the one or more foreign or contaminating substances that are undesirable.

As used herein, "molten" or "molten liquid" refers to one or more substances, together, that are melted.

As used herein, "melting" refers to the process of heating one or more solid substances to a point (called the melting point), or above, where they turn into a liquid. As such, the "melting" refers to a substance changing from a solid to a liquid, when exposed to sufficient heat.

As used herein, a "reaction product" refers to a compound formed by the chemical reaction of two or more substances. For example, impurities in the molten liquid (from the initial silicon source) can react with one or more substances in the alkali magnesium halide, to form a reaction product.

As used herein, "solidifying" refers to the process of cooling one or more liquid substances (e.g., molten liquid) below a point (called the melting point), where they turn into a solid. As such, the "solidifying" refers to a substance changing from a liquid to a solid, upon cooling.

As used herein, "removing" refers to the process of separating a substance from another substance (e.g., removing a solid or a liquid from a mixture) or separating a portion of a substance from another portion (e.g., removing a part of a solid from another part of the solid). The process can employ any technique known to those of skill in the art, e.g., decanting the mixture, skimming one or more liquids from the mixture, centrifuging the mixture, filtering the solids from the mixture, cutting a solid to remove a portion thereof, or a combination thereof.

As used herein, "solvent metal" refers to one or more metals, or an alloy thereof, which upon heating, can effectively dissolve silicon, resulting in a molten liquid. Suitable exemplary solvent metals include, e.g., aluminum, copper, tin, zinc, antimony, silver, bismuth, cadmium, gallium, indium, magnesium, lead, alloys thereof, and combinations thereof.

As used herein, an "alloy" refers to a homogeneous mixture of two or more elements, at least one of which is a metal, and where the resulting material has metallic properties. The resulting metallic substance usually has different properties (sometimes significantly different) from those of its components.

As used herein, "aluminum" refers to the chemical element that has the symbol Al and atomic number 13. The term includes metal aluminum or elemental aluminum ($Al^0$), or an alloy thereof. The aluminum will typically be used herein as a solvent metal.

As used herein, "boron" refers to the chemical element that has the symbol B and atomic number 5. The term includes compounds that include boron (i.e., boron-containing compounds that include $B^{3+}$, $B^{2+}$, or $B^+$), and combinations thereof.

As used herein, "phosphorus" refers to the chemical element that has the symbol P and atomic number 15. The term includes compounds that include phosphorus (i.e., phosphorus-containing compounds that include $P^{5+}$, $P^{4+}$, $P^{3+}$, $P^{2+}$, $P^+$, $P^{-1}$, $P^{2-}$, $P^-$), and combinations thereof.

As used herein, "silicon" refers to the chemical element that has the symbol Si and atomic number 14. The term includes metal or elemental silicon ($Si^0$), or an alloy thereof.

As used herein, "metallurgical grade silicon" or "MG silicon" refers to relatively pure (e.g., at least about 96.0 wt. %) silicon.

As used herein, "source silicon" refers to the silicon employed in the process described herein. The source silicon is purified (e.g., at least partially purified), to provide purified silicon crystals.

As used herein, "upgraded metallurgical grade silicon" or "UMG silicon" refers to a relatively intermediate pure (e.g., at least about 98.0 wt. %) silicon.

As used herein, "solar grade silicon" or "SOG silicon" refers to a relatively high pure (e.g., at least about 99.9999 wt. %) silicon.

As used herein, "crystalline" includes the regular, geometric arrangement of atoms in a solid. As such, "silicon crystals" refers to silicon having regular, geometric arrangement of the silicon atoms in a solid state.

As used herein, "contacting" refers to the act of touching, making contact, or of bringing substances into immediate proximity.

As used herein, "decanting" or "decantation" includes pouring off a fluid, leaving a sediment or precipitate, thereby separating the fluid from the sediment or precipitate.

As used herein, "filtering" or "filtration" refers to a mechanical method to separate solids from liquids by passing the feed stream through a porous sheet such as a ceramic or metal membrane, which retains the solids and allows the liquid to pass through. This can be accomplished by gravity, pressure or vacuum (suction). The filtering effectively separates the sediment and/or precipitate from the liquid.

As used herein, "mother liquor" refers to the part of a solution that is left over after crystallization and/or or washing. In crystallization, a solid (usually impure) is dissolved in a solvent at high temperature, taking advantage of the fact that most solids' solubilities are higher at higher temperatures. As the solution cools, the solubility of the solute in the solvent will gradually become smaller. The resultant solution is described as supersaturated, meaning that there is more solute dissolved in the solution than would be predicted by its solubility at that temperature. Crystallization can then be induced from this supersaturated solution and the resultant pure crystals removed by such methods as vacuum filtration and centrifugal separators. The remaining solution, once the crystals have been filtered out, is known as the mother liquor, and will contain a portion of the original solute (as predicted by its solubility at that temperature) as well as any impurities that were not filtered out. Second and third crops of crystals can then be harvested from the mother liquor.

As used herein, "eutectic" refers to the proportion of constituents in an alloy or other mixture that yields the lowest possible complete melting point. In all other proportions, the mixture will not have a uniform melting point; some of the mixture will remain solid and some liquid. At the eutectic, the solidus and liquidus temperatures are the same.

As shown in FIG. 1, substance X consists of two components, A and B (approximately 80% A and 20% B). Above the liquidus (the temperature at which the first solid begins to form) both components are liquid. As the temperature drops to the liquidus, component A starts to solidify, and the remaining liquid becomes less rich in component A and more rich in component B. When the temperature has dropped to the solidus, which is the same as the eutectic temperature, solid B starts to form as well. Below the solidus, the entire mixture is solid. A liquid of composition Y (consisting of approximately 80% B and 20% A) would cool in a similar manner, but with solid B forming first. Typically, a mixture of eutectic proportions is always either entirely solid or entirely liquid. See, *The American Heritage® Science Dictionary*, 2010 by Houghton Mifflin Harcourt Publishing Company. Published by Houghton Mifflin Harcourt Publishing Company.

As used herein, "liquidus" refers to a line on a phase diagram above which a given substance is stable in the liquid phase. Most commonly, this line represents a transition temperature. The liquidus can be a straight line, or it can be curved, depending upon the substance. The liquidus is most often applied to binary systems such as solid solutions, including metal alloys. The liquidus can be contrasted to the solidus. The liquidus and solidus do not necessarily align or overlap; if a gap exists between the liquidus and solidus, then within that gap, the substance is not stable as either a liquid or a solid.

As used herein, "solidus" refers to a line on a phase diagram below which a given substance is stable in the solid phase. Most commonly, this line represents a transition temperature. The solidus can be a straight line, or it can be curved, depending upon the substance. The solidus is most often applied to binary systems such as solid solutions, including metal alloys. The solidus can be contrasted to the liquidus. The solidus and liquidus do not necessarily align or overlap. If a gap exists between the solidus and liquidus, then within that gap, the substance is not stable as singly either a solid or a liquid.

As used herein, "batch" refers to a non-continuous production or use; something made or used in a single operation.

As used herein, "continuous" refers to non-batch production or use, an uninterrupted manufacture or use. A continuous process need not be infinitely continuous, but should be substantially continuous while the method containing the process is in operation.

Particle size is a notion introduced for comparing dimensions of solid particles. The particle size of a spherical object can be unambiguously and quantitatively defined by its diameter. However, a typical material object is likely to be irregular in shape and non-spherical. There are several methods for measuring particle size. Some of them are based on light, other on ultrasound, or electric field, or gravity, or centrifugation.

As used herein, "average mean diameter" is an average of particle size, and refers to an average of the diameter of a set of particles.

As used herein, "in situ" refers to in the mixture, or in the reaction mixture.

It is appreciated that those of skill in the art understand that a mixture of substances is typically characterized by those starting materials or intermediate components (e.g., solvent metal, an alkali magnesium halide, and silicon) that are useful in making the mixture. While these materials may undergo a substantial conversion, reference to the mixture as including these materials or substances is acceptable and appropriate to those of skill in the art. For example, a molten liquid can be formed from aluminum and an alkali magnesium halide. Subsequent to the introduction of these substances, any one or more of these substances (or an impurity located therein) can undergo a chemical and/or physical conversion, such that they may no longer expressly and literally meet the criteria to be classified as aluminum or an alkali magnesium halide. Reference to the mixture as including aluminum and an alkali magnesium halide is, however, acceptable and appropriate to those of skill in the art. This is so, even though it is believed that upon contacting (or forming) a molten liquid with aluminum, the alkali magnesium halide will decompose or react with an impurity from the aluminum. However, reference to the molten liquid as including aluminum and an alkali magnesium halide is appropriate.

Figure 2:
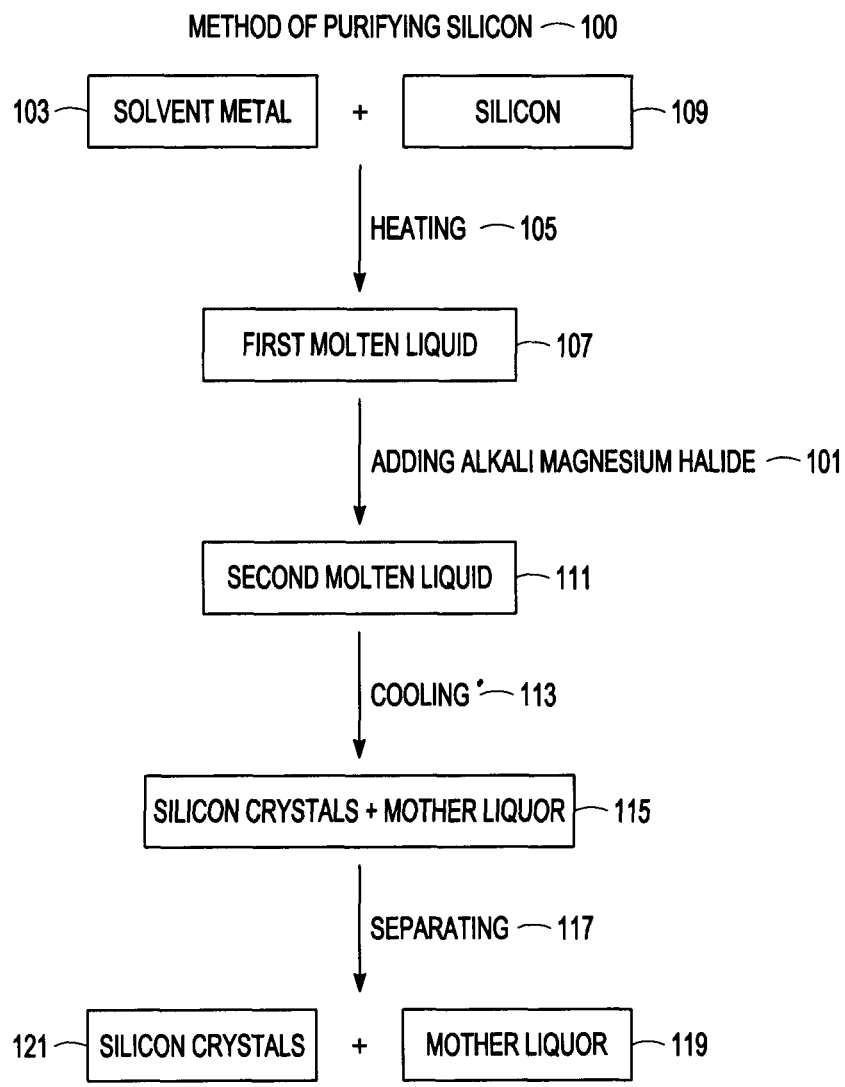
FIG. 2 illustrates a block flow diagram of a method for purifying silicon.

Referring to FIG. 2, an example of a block flow diagram of a method for purifying silicon 100 is shown, according to some embodiments. A first molten liquid 107 is formed by heating 105 a solvent metal 103 and silicon 109. A second molten liquid 111 is formed by contacting (e.g., adding) alkali magnesium halide 101 to the first molten liquid 107. The second molten liquid 111 is cooled 113 to provide the silicon crystals and mother liquor 115. The silicon crystals and mother liquor 115 are separated 117, to provide silicon crystals 121 and mother liquor 119.

Figure 3:
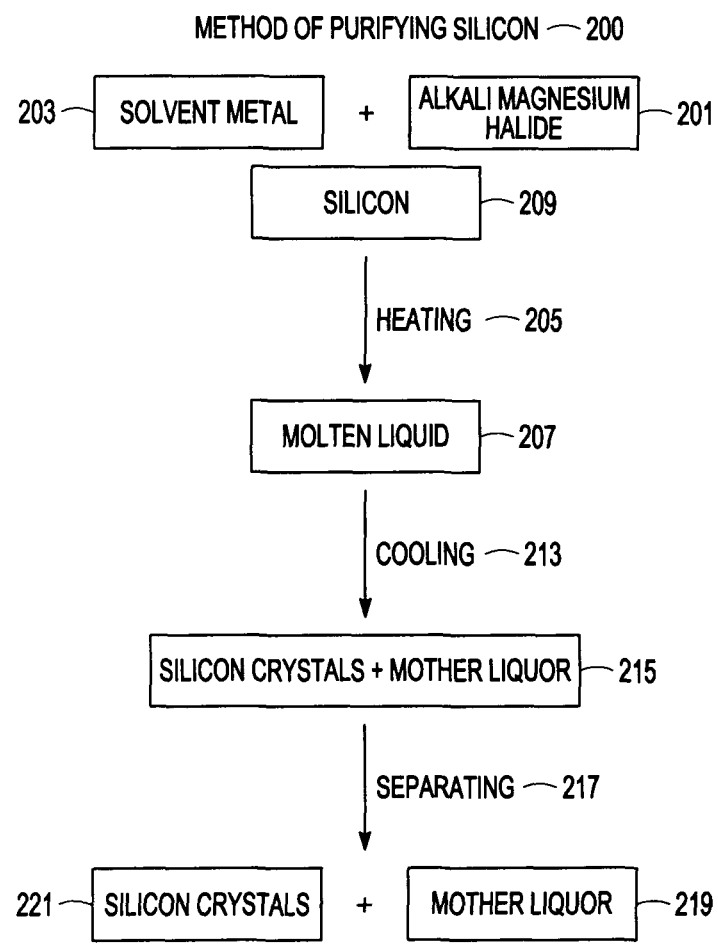
FIG. 3 illustrates a block flow diagram of a method for purifying silicon.

Referring to FIG. 3, an example of a block flow diagram of a method for purifying silicon 200 is shown, according to some embodiments. A molten liquid 207 is formed by heating 205 a solvent metal 203, alkali magnesium halide 201, and silicon 209. The molten liquid 207 is cooled 213, to provide silicon crystals and mother liquor 215. The silicon crystals and mother liquor 215 can be separated 217, to provide silicon crystals 221 and mother liquor 219.

Without being bound to any particular theory, it is believed that the alkali magnesium halide (101 or 201), upon contacting the first molten liquid 107 (or molten liquid 207), will react with and remove impurities located therein. These impurities (e.g., sodium, lithium, calcium, boron and/or phosphorous) can be from the source silicon (109 or 209) and/or the solvent metal (103 or 203). In specific embodiments, the alkali magnesium halide (101 or 201) can be injected into a bottom portion of the molten liquid, and allowed to float or rise to the top surface of the first molten liquid 107 (or molten liquid 207). As the alkali magnesium halide (101 or 201) floats or rises to the top surface of the first molten liquid 107 (or molten liquid 207), the alkali magnesium halide (101 or 201) is able to react with and remove impurities located therein.

Silicon for processing may be obtained from a number of sources. The silicon may be scrap or discarded silicon from manufacturing solar cell panels, semiconductor wafers or shaping ingots, for example. Often the silicon is part of a slurry. The slurry may include water, polyethylene glycol (PEG), silicon carbide, iron, aluminum, calcium, copper and other contaminants. The silicon may be removed from the slurry (e.g., separated) and dried to remove excess water. The powder may be separated from the slurry by centrifuge, settling or other processes. Adding water to the slurry can lower the specific gravity to help improve the settling or centrifuging. The silicon may undergo further processing to remove contaminants, such as by undergoing an acid treatment, for example. For example, hydrochloric acid can be used to dissolve the metals, such as iron, off of the surface of the silicon powder. Hydrofluoric acid, hydrochloric acid, nitric acid or a combination thereof may be used to dissolve silicon dioxide off of the surface of the powder or to dissolve the surface of the powder. Alternatively, potassium hydroxide, sodium hydroxide or a combination thereof may be used to dissolve the surface of the powder. The powder may also be treated with a magnetic separating process to remove iron and other magnetic elements.

Specifically, the silicon can include upgraded metallurgical grade (UMG) silicon, or metallurgical grade (MG) silicon. Alternatively, the silicon can be of a grade or quality that is below metallurgical grade (MG) silicon. Employing less pure silicon (e.g., silicon of a grade or quality that is below metallurgical grade (MG) silicon) can provide cost-savings, as well as allowing for the use of silicon that would otherwise not be feasible or practical.

The first molten liquid 107 can be formed, e.g., by: (i) heating 105 solvent metal 103 sufficient to form a first molten liquid 107, and subsequently adding the silicon 109 (not shown in FIG. 2), (ii) heating 105 a mixture of solvent metal 103 and silicon 109, sufficient to form a first molten liquid 107 (FIG. 2), or (iii) heating 105 silicon 109, sufficient to form a first molten liquid 107, and subsequently adding the solvent metal 103 (not shown in FIG. 2). Either way, a first molten liquid 107 that includes solvent metal 103 and silicon 109 can be formed. As such, the solvent metal 103 and silicon 109can be present, and together they can be heated 105 to form the first molten liquid 107 (FIG. 2). Alternatively (not shown in FIG. 2), the solvent metal 103 can be heated 105, sufficient to form a first molten liquid 107, and subsequently the silicon 109 can be added to the first molten liquid 107.

The alkali magnesium halide can be added 101 to the first molten liquid 107, to form a second molten liquid 111. Alternatively (not shown in FIG. 2), the first molten liquid 107 can be added to the alkali magnesium halide, to form a second molten liquid 111. Either way, the alkali magnesium halide and first molten liquid 107 are brought into contact with one another, to provide the second molten liquid 111.

Alternatively, a molten liquid 207 can be formed from heating 205 a solvent metal 203, silicon 209, and alkali magnesium halide 201 (FIG. 3). Specifically, the solvent metal 203, silicon 209, and alkali magnesium halide 201 can be contacted with each other (e.g., mixed), and together they can be heated 205 to form a molten liquid 207.

The first molten liquid 107, the second molten liquid 111 and/or the molten liquid 207 can be formed, such as by feeding into a vortex using a rotary degasser, molten metal pump, rotary furnace or by induction currents. The materials (e.g., solvent metal 203, alkali magnesium halide 201, silicon 209, silicon 109, solvent metal 103 and alkali magnesium halide 101) may be substantially dried and fed consistently into the vortex, thus limiting its contact with oxygen. The materials may be sheared into individual grains, such as by setting the mixer settings for high shear. The melting may occur under submersion in a molten bath. For example, the bath may be below the liquidus temperature and above the solidus temperature, so that it is easier to put more shear on the powder and easier to keep the powder submerged in the bath due to the increased viscosity of the bath. The furnace refractory may be low in contaminates, such as by having little to no phosphorus or boron in the material. Fused silica may be an example of an acceptable refractory. Similarly, if a rotary degasser or molten metal pump is utilized, they may be manufactured with little phosphorus or boron to minimize contamination.

The materials may be kept submerged by utilizing melt turbulence. The melting may occur under mixing conditions in which the temperature is maintained above the solidus temperature.

The heating 105 or 205 can be carried out in a suitable manner to achieve a temperature that will effectively form a first molten liquid 107, second molten liquid 111 and/or molten liquid 207. For example, the first molten liquid 107, second molten liquid 111 and/or molten liquid 207 can be formed at a temperature above the solidus temperature. Specifically, the first molten liquid 107, second molten liquid 111 and/or molten liquid 207 can be formed at a temperature of at least about 1450° C.

Any suitable amount (or ratio) of solvent metal, alkali magnesium halide and silicon can be employed, provided a first molten liquid 107, second molten liquid 111 and/or molten liquid 207 is formed, and the desired impurities are removed from the silicon and/or aluminum, in a requisite amount.

The second molten liquid 111 can be cooled 113 to form silicon crystals and mother liquor 115. Likewise, the molten liquid 207 can be cooled 213 to form silicon crystals and mother liquor 215. The cooling 113 (or 213) can be carried out in any suitable manner, provided the silicon crystals and mother liquor 115 (or 215) is obtained. For example, the cooling 113 (or 213) can be carried out at about room temperature (about 20° C.), for an extended period of time. Additionally, the cooling 113 (or 213) can be carried out at a suitable rate, e.g., up to about 150° C./hr.

The second molten liquid 111 (or molten liquid 207) can be cooled 113 (or 213) over any suitable and appropriate period of time, provided silicon crystals are obtained in a mother liquor 115 (or 215). For example, the second molten liquid 111 (or molten liquid 207) can be cooled 113 (or 213) over a period of time of at least about 2 hours.

Upon cooling 113 (or 213), the silicon crystals and mother liquor 115 (or 215) can be separated 117 (or 217), to provide separated silicon crystals 121 (or 221) and mother liquor 119 (or 219). The separation 117 (or 217) can be carried out utilizing any suitable technique, such as, e.g., decanting (e.g., pouring off the mother liquor from the silicon crystals), and/or filtering.

As stated above, the second molten liquid 111 can be cooled 113 to form silicon crystals and mother liquor 115, and the molten liquid 207 can be cooled 213 to form silicon crystals and mother liquor 215. In one embodiment, the cooling 113 (or 213) can occur without any significant or appreciable agitation of second molten liquid 111 (or molten liquid 207). Alternatively, the second molten liquid 111 (or molten liquid 207) can be cooled 113 (or 213) while agitating the second molten liquid 111 (or molten liquid 207).

Without being bound to any particular theory, it is believed that during the cooling 113 (or 213), agitating can provide relatively small silicon crystals of a relatively high purity, which can be difficult to strain. In specific embodiments, a small amount of mixing can provide silicon crystals of at least about 1 mm (thickness), by about 5 mm (width), by about 5 mm (length).

Additionally, the second molten liquid 111 (or molten liquid 207) can be cooled 113 (or 213) to any suitable and appropriate temperature (such as between the liquidus and solidus temperature), provided silicon crystals are obtained in a mother liquor 115 (or 215). For example, the second molten liquid 111 (or molten liquid 207) can be cooled 113 (or 213) to a temperature of about 585-1400° C.

The silicon crystals and mother liquor 115 (or 215) can be separated 117 (or 217), to provide separated silicon crystals 121 (or 221) and mother liquor 119 (or 219). The separation 117 (or 217) can be carried out in any suitable and appropriate manner. For example, the separation 117 (or 217) can be carried out by pouring off the mother liquor from the silicon crystals. Alternatively, the separation 117 (or 217) can be carried out by straining and/or filtering the silicon crystals from the mother liquor. Alternatively, the separation can be carried out employing centrifugation.

In one specific embodiment, the silicon crystals 121 (or 221) obtained can be employed or re-used as the silicon 109 (or 209) in a subsequent purification. This re-use can be carried out multiple times (e.g., 2, 3, 4 or 5), to provide silicon crystals 121 (or 221) having a requisite purity level. As such, the method for purifying silicon 100 (or 200), to provide silicon crystals 121 (or 221), can be carried out once. In alternative embodiments, the method for purifying silicon 100 (or 200), to provide silicon crystals 121 (or 221), can be carried out two or more (e.g., 2, 3, 4 or 5) times.

The method for purifying silicon 100 (or 200) provides silicon crystals 121 (or 221) that are relatively pure, compared to the silicon 109 (or 209). These silicon crystals 121 (or 221) can then be used, with or without subsequent purification, e.g., in the manufacturing of solar cells, which can subsequently be used in the manufacturing of solar panels. The method for purifying silicon 100 (or 200) provides silicon crystals 121 (or 221) that are purified from boron, such that at least some of the boron is removed from the starting silicon 109 (or 209). For example, the silicon crystals 121 (or 221) can include less than about 4 ppmw boron. Additionally, up to about 85 wt. % of boron present in the starting silicon 109 (or 209) can be removed to provide the silicon crystals 121 (or 221). The silicon crystals 121 (or 221) can also include less than about 5 ppmw phosphorus. Additionally, up to about 85 wt. % of phosphorus present in the starting silicon 109 (or 209) can be removed to provide the silicon crystals 121 (or 221). Additional substances other than boron and/or phosphorous can be removed from the silicon 100 (or 200), to provide silicon crystals 121 (or 221). The resulting silicon crystals 121 (or 221) will therefore be relatively pure. For example, the silicon crystals 121 (or 221) can include silicon in at least about 98 wt. % purity.

Specific ranges, values, and embodiments provided below are for illustration purposes only, and do not otherwise limit the scope of the disclosed subject matter, as defined by the claims. The specific ranges, values, and embodiments described below encompass all combinations and sub-combinations of each disclosed range, value, and embodiment, whether or not expressly described as such.

Specific Ranges, Values, and Embodiments

The methods described herein can increase the purity of silicon, with respect to one or more substances (e.g., impurities). In specific embodiments, the silicon is at least partially purified from phosphorous (i.e., the purified silicon crystals include less phosphorous than the source silicon). In additional specific embodiments, the silicon is at least partially purified from boron (i.e., the purified silicon crystals include less boron than the source silicon). In additional specific embodiments, the silicon is at least partially purified from aluminum (i.e., the purified silicon crystals include less aluminum than the source silicon).

In specific embodiments, the purified silicon crystals include less than about 5 ppmw phosphorous. In additional specific embodiments, the purified silicon crystals include less than about 4 ppmw phosphorous. In additional specific embodiments, the purified silicon crystals include less than about 3 ppmw phosphorous.

In specific embodiments, the purified silicon crystals include less than about 6 ppmw boron. In additional specific embodiments, the purified silicon crystals include less than about 5 ppmw boron. In additional specific embodiments, the purified silicon crystals include less than about 4 ppmw boron.

In specific embodiments, the purified silicon crystals include less than about 5,000 ppmw aluminum. In additional specific embodiments, the purified silicon crystals include less than about 3,000 ppmw aluminum. In additional specific embodiments, the purified silicon crystals include less than about 1,500 ppmw aluminum. In additional specific embodiments, the purified silicon crystals include less than about 1,000 ppmw aluminum.

The methods described herein can provide for purified silicon crystals, having a suitable size. In specific embodiments, the purified silicon crystals have an average mean diameter of at least about 0.25 cm. In additional specific embodiments, the purified silicon crystals have an average mean diameter of at least about 0.5 cm. In additional specific embodiments, the purified silicon crystals have an average mean diameter of at least about 0.75 cm. In additional specific embodiments, the purified silicon crystals have an average mean diameter of about 0.25 cm to about 0.75 cm.

The methods described herein can employ silicon of a suitable purity (or impurity) level. In specific embodiments, the source silicon includes upgraded metallurgical grade (UMG) silicon. In additional specific embodiments, the source silicon includes metallurgical grade (MG) silicon. In additional specific embodiments, the source silicon includes silicon of a grade or quality that is below metallurgical grade (MG) silicon.

In specific embodiments, the source silicon (e.g., the silicon that forms a molten liquid) has a purity of less than about 99 wt. %. In additional specific embodiments, the source silicon (e.g., the silicon that forms a molten liquid) has a purity of less than about 98 wt. %. In additional specific embodiments, the source silicon (e.g., the silicon that forms a molten liquid) has a purity of less than about 97.5 wt. %. In additional specific embodiments, the source silicon (e.g., the silicon that forms a molten liquid) has a purity of less than about 97 wt. %. In additional specific embodiments, the source silicon (e.g., the silicon that forms a molten liquid) has a purity of less than about 96.5 wt. %. In additional specific embodiments, the source silicon (e.g., the silicon that forms a molten liquid) has a purity of less than about 96 wt. %. In additional specific embodiments, the source silicon (e.g., the silicon that forms a molten liquid) has a purity of less than about 95.5 wt. %. In additional specific embodiments, the source silicon (e.g., the silicon that forms a molten liquid) has a purity of less than about 95 wt. %.

In specific embodiments, the source silicon includes metallurgical grade silicon, with a phosphorous level up to about 90 ppmw. In additional specific embodiments, the source silicon includes metallurgical grade silicon, with a phosphorous level up to about 60 ppmw. In additional specific embodiments, the source silicon includes metallurgical grade silicon, with a phosphorous level up to about 40 ppmw.

In specific embodiments, the source silicon includes metallurgical grade silicon, with a phosphorous level at least about 10 ppmw. In additional specific embodiments, the source silicon includes metallurgical grade silicon, with a phosphorous level at least about 20 ppmw. In additional specific embodiments, the source silicon includes metallurgical grade silicon, with a phosphorous level at least about 40 ppmw. In additional specific embodiments, the source silicon includes metallurgical grade silicon, with a phosphorous level at least about 60 ppmw.

In specific embodiments, the source silicon includes metallurgical grade silicon, with a boron level up to about 25 ppmw. In additional specific embodiments, the source silicon includes metallurgical grade silicon, with a boron level up to about 15 ppmw. In additional specific embodiments, the source silicon includes metallurgical grade silicon, with a boron level up to about 10 ppmw.

In specific embodiments, the source silicon includes metallurgical grade silicon, with a boron level at least about 3 ppmw. In additional specific embodiments, the source silicon includes metallurgical grade silicon, with a boron level at least about 7 ppmw. In additional specific embodiments, the source silicon includes metallurgical grade silicon, with a boron level at least about 10 ppmw. In additional specific embodiments, the source silicon includes metallurgical grade silicon, with a boron level at least about 15 ppmw.

In specific embodiments, the alkali magnesium halide is employed in at least about 0.05 wt. % of the molten liquid. In additional specific embodiments, the alkali magnesium halide is employed in at least about 0.10 wt. % of the molten liquid. In additional specific embodiments, the alkali magnesium halide is employed in about 0.10 wt. % to about 2.5 wt. % of the molten liquid. In additional specific embodiments, the alkali magnesium halide is employed in up to about 5 wt. % of the molten liquid. In additional specific embodiments, the alkali magnesium halide is employed in up to about 2.5 wt. % of the molten liquid.

In specific embodiments, the alkali magnesium halide includes synthetic carnallite. In additional specific embodiments, the alkali magnesium halide includes naturally occurring (e.g., natural) carnallite. In additional specific embodiments, the alkali magnesium halide includes anhydrous carnallite. In additional specific embodiments, the alkali magnesium halide includes hydrated carnallite. In additional specific embodiments, the alkali magnesium halide includes potassium magnesium chloride. In additional specific embodiments, the alkali magnesium halide includes at least one of $KMgCl_3$, $K_2MgCl_4$, $K_3Mg_2Cl_7$, $Na_2MgCl_4$, and $MgNaCl_3$. In additional specific embodiments, the alkali magnesium halide includes at least one of $KMgCl_3$, $K_2MgCl_4$, and $K_3Mg_2Cl_7$. In additional specific embodiments, the alkali magnesium halide includes a combination of $KMgCl_3$, $K_2MgCl_4$, and $K_3Mg_2Cl_7$.

In specific embodiments, the alkali magnesium halide includes potassium magnesium chloride as fine particles. In additional specific embodiments, the alkali magnesium halide includes potassium magnesium chloride in a granular form (e.g., average particle size of about 0.03-0.12 in, or about 0.8-3.15 mm).

In specific embodiments, the solvent metal includes at least one of copper, tin, zinc, antimony, silver, bismuth, aluminum, cadmium, gallium, indium, magnesium, lead, an alloy thereof, and combinations thereof. In additional specific embodiments, the solvent metal includes aluminum or an alloy thereof, and at least one of copper, tin, zinc, antimony, silver, bismuth, cadmium, gallium, indium, magnesium, lead, an alloy thereof. In additional specific embodiments, the solvent metal includes aluminum or an alloy thereof. In additional specific embodiments, the solvent metal includes aluminum.

In specific embodiments, the molten liquid is formed by contacting a solvent metal and silicon to form a mixture, heating the mixture to form a molten liquid, and then contacting the molten liquid with an alkali magnesium halide.

In specific embodiments, the molten liquid is formed by contacting a solvent metal and silicon to form a mixture, heating the mixture to form a molten liquid, and then contacting the molten liquid with an alkali magnesium halide, wherein the alkali magnesium halide is contacted with the molten liquid at a bottom portion of the molten liquid.

In specific embodiments, the molten liquid is formed by contacting a solvent metal and silicon to form a mixture, heating the mixture to form a molten liquid, and then contacting the molten liquid with an alkali magnesium halide, wherein the alkali magnesium halide is contacted with the molten liquid at a bottom portion of the molten liquid by injecting the alkali magnesium halide into a bottom portion of the molten liquid.

In specific embodiments, the molten liquid is formed by contacting a solvent metal and silicon to form a mixture, heating the mixture to form a molten liquid, and then contacting the molten liquid with an alkali magnesium halide, wherein the alkali magnesium halide is contacted with the molten liquid at a bottom portion of the molten liquid by injecting the alkali magnesium halide into a bottom portion of the molten liquid, and the alkali magnesium halide is allowed to float or rise to the top surface of the molten liquid.

In specific embodiments, the mother liquor includes at least about 2,000 ppmw aluminum. In additional specific embodiments, the mother liquor includes at least about 1,000 ppmw aluminum. In additional specific embodiments, the mother liquor includes at least about 500 ppmw aluminum.

In specific embodiments, the silicon that forms the molten liquid includes silicon recycled from a silicon purification process.

In specific embodiments, the heating to form molten liquid, can be carried out, to achieve a temperature of at least about 1400° C. In additional specific embodiments, the heating to form molten liquid, can be carried out, to achieve a temperature of at least about 1450° C. In additional specific embodiments, the heating to form molten liquid, can be carried out, to achieve a temperature of at least about 1500° C. In additional specific embodiments, the heating to form molten liquid, can be carried out, to achieve a temperature of about 1400° C. to about 1600° C. In additional specific embodiments, the heating to form molten liquid, can be carried out, to achieve a temperature of about 1450° C. to about 1550° C.

In specific embodiments, the cooling of the molten liquid to provide the silicon crystals and the mother liquor is carried out to a temperature above the solidus temperature. In additional specific embodiments, the cooling of the molten liquid to provide the silicon crystals and the mother liquor is carried out to a temperature between the solidus and the liquidus temperature.

In specific embodiments, the cooling can be carried out at a temperature of at least about 20° C. In additional specific embodiments, the cooling can be carried out at a temperature of about 0° C. to about 60° C. In additional specific embodiments, the cooling can be carried out at a temperature of about 15° C. to about 40° C. In additional specific embodiments, the cooling can be carried out at a rate of up to about 500° C./hr, up to about 250° C./hr, up to about 125° C./hr, up to about 100° C./hr, or up to about 75° C./hr.

In specific embodiments, the molten liquid can be cooled close to, but above the solidus temperature (e.g., within about 200° C. above the solidus temperature, within about 125° C. above the solidus temperature, or within about 50° C. above the solidus temperature). In additional specific embodiments, the molten liquid can be cooled to a temperature of about 700° C. to about 750° C. In additional specific embodiments, the molten liquid can be cooled to above the solidus temperature and below the liquidus temperature. In additional specific embodiments the molten liquid may be cooled to a temperature below the liquidus temperature.

In specific embodiments, the molten liquid can be cooled over a period of time of at least about 2 hours. In additional specific embodiments, the molten liquid can be cooled over a period of time of at least about 4 hours. In additional specific embodiments, the molten liquid can be cooled over a period of time of at least about 8 hours. In additional specific embodiments, the molten liquid can be cooled over a period of time of at least about 12 hours. In additional specific embodiments, the molten liquid can be cooled over a period of time of at least about 24 hours. In additional specific embodiments, the molten liquid can be cooled over a period of time of at least about 48 hours.

In specific embodiments, the methods described herein are employed for purifying silicon (e.g., the method is carried out to purify silicon). In additional specific embodiments, the method is one for purifying silicon (e.g., the method is carried out to purify silicon), wherein the purified silicon can subsequently be further purified. In additional specific embodiments, the method is one for purifying silicon (e.g., the method is carried out to purify silicon), wherein the purified silicon can subsequently be further purified employing, e.g., directional solidification (DS). In additional specific embodiments, the method is one for purifying silicon (e.g., the method is carried out to purify silicon), wherein the purified silicon can subsequently be further purified and used for the manufacture of solar panels.

In specific embodiments, the method is carried out in a batch or continuous fashion. In additional specific embodiments, the method is carried out in a batch fashion. In additional specific embodiments, the method is carried out in a continuous fashion.

The methods described herein can produce silicon crystals having a requisite purity. In specific embodiments, the purified silicon crystals are at least about 95 wt. % pure. In additional specific embodiments, the purified silicon crystals are at least about 96 wt. % pure. In additional specific embodiments, the purified silicon crystals are at least about 97 wt. % pure. In additional specific embodiments, the purified silicon crystals are at least about 98 wt. % pure. In additional specific embodiments, the purified silicon crystals are at least about 98.5 wt. % pure. In additional specific embodiments, the purified silicon crystals are at least about 99 wt. % pure. In additional specific embodiments, the purified silicon crystals are at least about 99.5 wt. % pure.

The methods described herein can produce purified silicon crystals on a commercial or industrial scale. In specific embodiments, the methods described herein can produce at least about 150 kg of silicon crystals, per batch. In specific embodiments, the methods described herein can produce at least about 240 kg of silicon crystals, per batch. In specific embodiments, the methods described herein can produce at least about 300 kg of silicon crystals, per batch. In specific embodiments, the methods described herein can produce at least about 500 kg of silicon crystals, per batch.

The methods described herein include steps, wherein each and every one of steps can be carried out only one time. Alternatively, the methods described herein include steps, wherein any one or more of the steps can independently be repeated, one or more times. For example, any one or more of the steps can independently be repeated, once, twice, three, four or five times. Additionally, the methods described herein include steps, wherein each and every one of the steps can independently be repeated, one or more times. For example, each of the steps can independently be repeated, once, twice, three, four or five times.

Specific enumerated embodiments [1] to [51] provided below are for illustration purposes only, and do not otherwise limit the scope of the disclosed subject matter, as defined by the claims. These enumerated embodiments encompass all combinations, sub-combinations, and multiply referenced (e.g., multiply dependent) combinations of the embodiments described therein.

Enumerated Embodiments

[1.] A method comprising:
(a) forming a molten liquid from a solvent metal, silicon, and an alkali magnesium halide;
(b) cooling the molten liquid to provide silicon crystals and a mother liquor; and
(c) separating the silicon crystals from the mother liquor.

[2.] The method of embodiment 1, which is a method for purifying silicon.

[3.] The method of any one of the above embodiments, wherein the silicon crystals are purified from phosphorous.

[4.] The method of any one of the above embodiments, wherein the silicon crystals are purified from boron.

[5.] The method of any one of the above embodiments, wherein the molten liquid is formed by contacting a solvent metal and silicon to form a mixture, heating the mixture to form a molten liquid, and then contacting the molten liquid with an alkali magnesium halide.

[6.] The method of any one of the above embodiments, wherein the molten liquid is formed by contacting a solvent metal and silicon to form a mixture, heating the mixture to form a molten liquid, and then contacting the molten liquid with an alkali magnesium halide, wherein the alkali magnesium halide is contacted with the molten liquid at a bottom portion of the molten liquid.

[7.] The method of any one of the above embodiments, wherein the molten liquid is formed by contacting a solvent metal and silicon to form a mixture, heating the mixture to form a molten liquid, and then contacting the molten liquid with an alkali magnesium halide, wherein the alkali magnesium halide is contacted with the molten liquid at a bottom portion of the molten liquid by injecting the alkali magnesium halide into a bottom portion of the molten liquid.

[8.] The method of any one of the above embodiments, wherein the molten liquid is formed by contacting a solvent metal and silicon to form a mixture, heating the mixture to form a molten liquid, and then contacting the molten liquid with an alkali magnesium halide, wherein the alkali magnesium halide is contacted with the molten liquid at a bottom portion of the molten liquid by injecting the alkali magnesium halide into a bottom portion of the molten liquid, and the alkali magnesium halide is allowed to float or rise to the top surface of the molten liquid.

[9.] The method of any one of the above embodiments, wherein the silicon that contacts the molten liquid is metallurgical grade (MG) silicon.

[10.] The method of any one of the above embodiments, wherein the silicon that contacts the molten liquid is metallurgical grade (MG) silicon, with a phosphorous level up to about 60 ppmw.

[11.] The method of any one of the above embodiments, wherein the silicon that contacts the molten liquid is metallurgical grade (MG) silicon, with a boron level up to about 15 ppmw.

[12.] The method of any one of the above embodiments, wherein the silicon crystals separated from the mother liquor comprise less than about 8 ppmw phosphorous.

[13.] The method of any one of the above embodiments, wherein the silicon crystals separated from the mother liquor comprise less than about 4 ppmw phosphorous.

[14.] The method of any one of the above embodiments, wherein the silicon crystals separated from the mother liquor comprise less than about 5 ppmw boron.

[15.] The method of any one of the above embodiments, wherein the silicon crystals separated from the mother liquor comprise less than about 1 ppmw boron.

[16.] The method of any one of the above embodiments, wherein the solvent metal comprises at least one of copper, tin, zinc, antimony, silver, bismuth, aluminum, cadmium, gallium, indium, magnesium, lead, and alloys thereof.

[17.] The method of any one of the above embodiments, wherein the solvent metal comprises aluminum.

[18.] The method of any one of the above embodiments, wherein the alkali magnesium halide is employed in at least about 0.05 wt. % of the molten liquid.

[19.] The method of any one of the above embodiments, wherein the alkali magnesium halide is employed in at least about 0.10 wt. % of the molten liquid.

[20.] The method of any one of the above embodiments, wherein the alkali magnesium halide is employed in about 0.10 wt. % to about 5 wt. % of the molten liquid.

[21.] The method of any one of the above embodiments, wherein the alkali magnesium halide is employed in up to about 10 wt. % of the molten liquid.

[22.] The method of any one of the above embodiments, wherein the cooling of the molten liquid to provide the silicon crystals and the mother liquor is carried out to a temperature above the solidus temperature.

[23.] The method of any one of the above embodiments, wherein the cooling of the molten liquid to provide the silicon crystals and the mother liquor is carried out to a temperature between the solidus and the liquidus temperature.

[24.] The method of any one of the above embodiments, wherein the silicon crystals separated from the mother liquor comprise less than about 3,000 ppmw aluminum.

[25.] The method of any one of the above embodiments, wherein the silicon crystals separated from the mother liquor comprise less than about 1,500 ppmw aluminum.

[26.] The method of any one of the above embodiments, wherein at least about 240 kg of silicon crystals is obtained.

[27.] The method of any one of the above embodiments, wherein any one or more of steps (a)-(c) is repeated one or more times.

[28.] The method of any one of the above embodiments, wherein each of steps (a)-(c) is independently repeated one or more times.

[29.] The method of any one of the above embodiments, carried out in a batch or continuous fashion.

[30.] The method of any one of the above embodiments, wherein the mother liquor comprises at least about 1,000 ppmw aluminum.

[31.] The method of any one of the above embodiments, wherein the silicon crystals have an average mean diameter of at least about 0.5 cm.

[32.] The method of any one of the above embodiments, wherein the alkali magnesium halide comprises synthetic carnallite.

[33.] The method of any one of the above embodiments, wherein the alkali magnesium halide comprises anhydrous carnallite.

[34.] The method of any one of the above embodiments, wherein the alkali magnesium halide comprises potassium magnesium chloride.

[35.] The method of any one of the above embodiments, wherein the alkali magnesium halide comprises at least one of $KMgCl_3$, $K_2MgCl_4$, $K_3Mg_2Cl_7$, $Na_2MgCl_4$, and $MgNaCl_3$.

[36.] The method of any one of the above embodiments, wherein the alkali magnesium halide comprises at least one of $KMgCl_3$, $K_2MgCl_4$, and $K_3Mg_2Cl_7$.

[37.] The method of any one of the above embodiments, wherein the alkali magnesium halide comprises a combination of $KMgCl_3$, $K_2MgCl_4$, and $K_3Mg_2Cl_7$.

[38.] The method of any one of the above embodiments, wherein the silicon crystals are at least about 98 wt. % pure.

[39.] The method of any one of the above embodiments, wherein the silicon that forms the molten liquid has a purity of less than about 98 wt. %.

[40.] The method of any one of the above embodiments, wherein the alkali magnesium halide comprises potassium magnesium chloride as fine particles.

[41.] The method of any one of the above embodiments, wherein the alkali magnesium halide comprises potassium magnesium chloride in a granular form.

[42.] The method of any one of the above embodiments, further comprising contacting the molten liquid with magnesium metal ($Mg^0$).

[43.] The method of any one of the above embodiments, further comprising contacting the molten liquid with magnesium metal ($Mg^0$), employed in at least about 0.1 wt. % of the molten liquid.

[44.] The method of any one of the above embodiments, further comprising contacting the molten liquid with magnesium metal ($Mg^0$), employed in up to about 10 wt. % of the molten liquid.

[45.] The method of any one of the above embodiments, further comprising contacting the molten liquid with magnesium metal ($M^0$), employed in about 0.2-5 wt. % of the molten liquid.

[46.] The method of any one of the above embodiments, further comprising contacting the molten liquid with at least one of $MgCl_2$, KCl, and NaCl. [47.] The method of any one of the above embodiments, further comprising contacting the molten liquid with at least one of chlorine ($Cl_2$), oxygen ($O_2$), nitrogen ($N_2$), helium (He), argon (Ar), hydrogen ($H_2$), sulfur hexafluoride ($SF_6$), phosgene ($COCl_2$), carbon tetrachloride $CCl_4$, water vapor ($H_2O$), oxygen ($O_2$), carbon dioxide ($CO_2$), carbon monoxide (CO), tetrachlorosilane ($SiCl_4$) and tetrafluorosilane ($SiF_4$).

[48.] The method of any one of the above embodiments, wherein the silicon crystals are purified from phosphorous, such that at least about 25 wt. % of the phosphorous is removed from the silicon.

[49.] The method of any one of the above embodiments, wherein the silicon crystals are purified from phosphorous, such that at least about 33 wt. % of the phosphorous is removed from the silicon.

[50.] The method of any one of the above embodiments, wherein the silicon crystals are purified from phosphorous, such that up to about 50 wt. % of the phosphorous is removed from the silicon.

[51.] The method of any one of the above embodiments, wherein the silicon crystals are purified from phosphorous, such that up to about 43 wt. % of the phosphorous is removed from the silicon.

The invention claimed is:

1. A method comprising:
   (a) forming a molten liquid from a solvent metal, a first silicon, and an alkali magnesium halide, wherein the solvent metal comprises at least one of copper, tin, zinc, antimony, silver, bismuth, aluminum, cadmium, gallium, indium, magnesium, lead, and alloys thereof, wherein the alkali magnesium halide is employed in at least about 0.10 wt. % of the molten liquid and up to about 10 wt. % of the molten liquid and the alkali magnesium halide comprises a combination of at least two of: synthetic carnallite; anhydrous carnallite; potassium magnesium chloride, $KMgCl_3$, $K_2MgCl_4$, $K_3Mg_2Cl_7$, $Na_2MgCl_4$, and $MgNaCl_3$, and wherein the first silicon has a phosphorous level up to about 60 ppmw and a boron level up to about 15 ppmw;
   (b) cooling the molten liquid to provide silicon crystals and a mother liquor; and
   (c) separating the silicon crystals from the mother liquor; wherein the silicon crystals are purified from phosphorous and boron compared to the first silicon.

2. The method of claim 1, wherein the molten liquid is formed by contacting the solvent metal and the first silicon to form a mixture, heating the mixture to form a molten liquid, and then contacting the molten liquid with the alkali magnesium halide.

3. The method of claim 2, wherein the alkali magnesium halide is contacted with the molten liquid at a bottom portion of the molten liquid by injecting the alkali magnesium halide into a bottom portion of the molten liquid.

4. The method of claim 1, wherein the silicon crystals separated from the mother liquor comprise less than about 8 ppmw phosphorous without any further purification.

5. The method of claim 1, wherein the silicon crystals separated from the mother liquor comprise less than about 5 ppmw boron without any further purification.

6. The method of claim 1, wherein the cooling of the molten liquid to provide the silicon crystals and the mother liquor is carried out to a temperature above the solidus temperature.

7. The method of claim 1, wherein the silicon crystals separated from the mother liquor comprise less than about 3,000 ppmw aluminum.

8. The method of claim 1, wherein any one or more of steps (a)-(c) is repeated one or more times.

9. The method of claim 1, wherein the mother liquor comprises at least about 1,000 ppmw aluminum.

10. A method comprising:
    (a) forming a molten liquid from a solvent metal, silicon, and an alkali magnesium halide, wherein the alkali magnesium halide comprises a combination of $KMgCl_3$, $K_2MgCl_4$, and $K_3Mg_2Cl_7$;
    (b) cooling the molten liquid to provide silicon crystals and a mother liquor; and
    (c) separating the silicon crystals from the mother liquor.

11. The method of claim 1, wherein the alkali magnesium halide comprises potassium magnesium chloride as at least one of fine particles or a granular form.

12. The method of claim 1, further comprising contacting the molten liquid with magnesium metal ($Mg^0$).

13. The method of claim 12, wherein the magnesium metal is employed in at least about 0.1 wt. % of the molten liquid.

14. The method of claim 1, further comprising contacting the molten liquid with at least one of $MgCl_2$, KCl, and NaCl.

15. The method of claim 1, wherein the silicon crystals are purified from phosphorous, such that at least about 25 wt. % of the phosphorous is removed from the first silicon.

16. The method of claim 1, wherein the silicon crystals separated from the mother liquor comprise less than about 4 ppmw phosphorous and less than about 1 ppmw boron without any further purification.

17. The method of claim 1, wherein the silicon crystals separated from the mother liquor are purified such that at least about 33 wt. % of the phosphorous from the first silicon is removed without any further purification.

18. A method comprising:
    (a) forming a molten liquid from a solvent metal, a first silicon, and an alkali magnesium halide, wherein the alkali magnesium halide comprises a combination of two or more of $YMgX_3$, $Y_2MgX_4$, and $Y_3Mg_2X_7$, wherein X is a halide element and Y is an alkali element;
    (b) cooling the molten liquid to provide silicon crystals and a mother liquor; and
    (c) separating the silicon crystals from the mother liquor.

19. The method of claim 18, wherein each X is independently selected from a chlorine (Cl) atom or a bromine (Br) atom and each Y is independent selected from a potassium (K) atom or a sodium (Na) atom.

* * * * *